(No Model.) 2 Sheets—Sheet 1.
F. W. HUBBARD.
WHEELED SCRAPER.
No. 354,473. Patented Dec. 14, 1886.
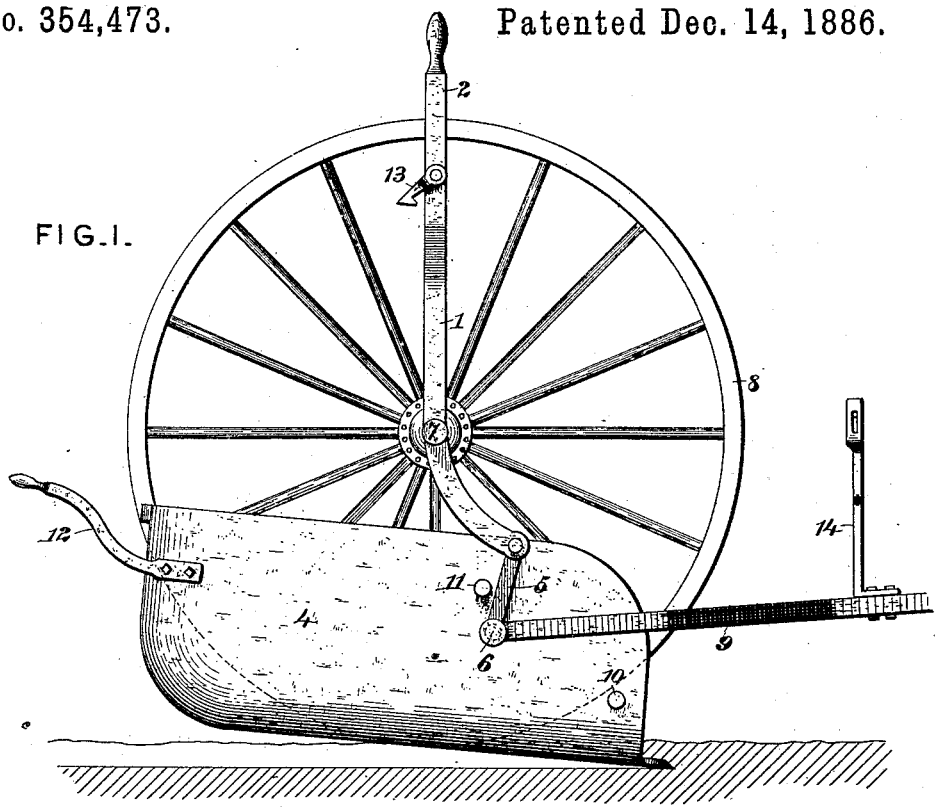
FIG. I.
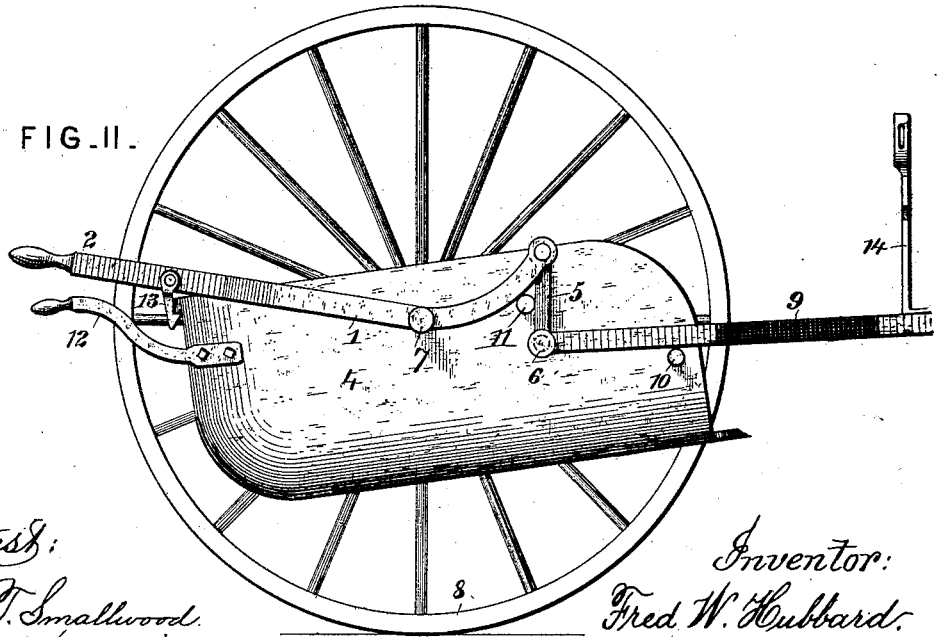
FIG. II.
Attest:
Geo. T. Smallwood.
F. A. Stopkins
Inventor:
Fred W. Hubbard.
By Knight Bros.
Attys (No Model.) 2 Sheets—Sheet 2.
F. W. HUBBARD.
WHEELED SCRAPER.
No. 354,473. Patented Dec. 14, 1886.
FIG. III.
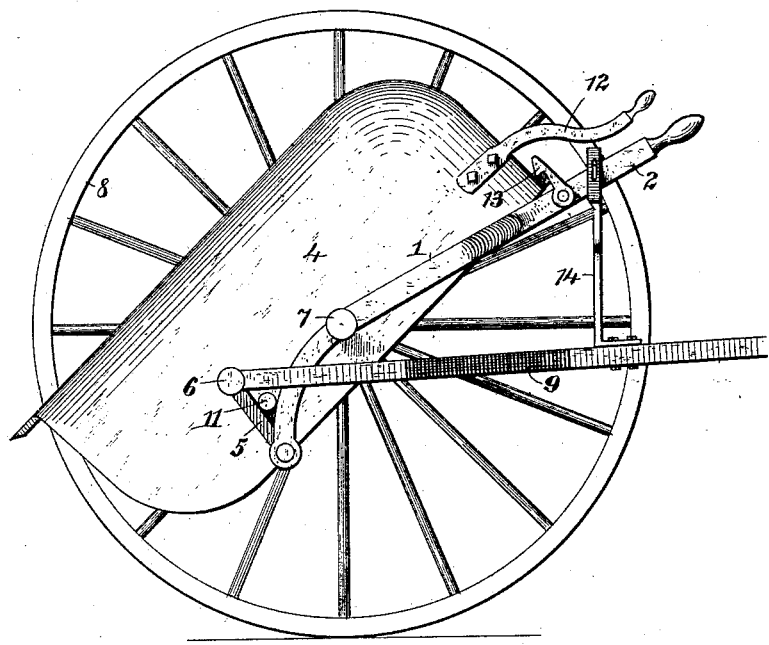
FIG. IV.
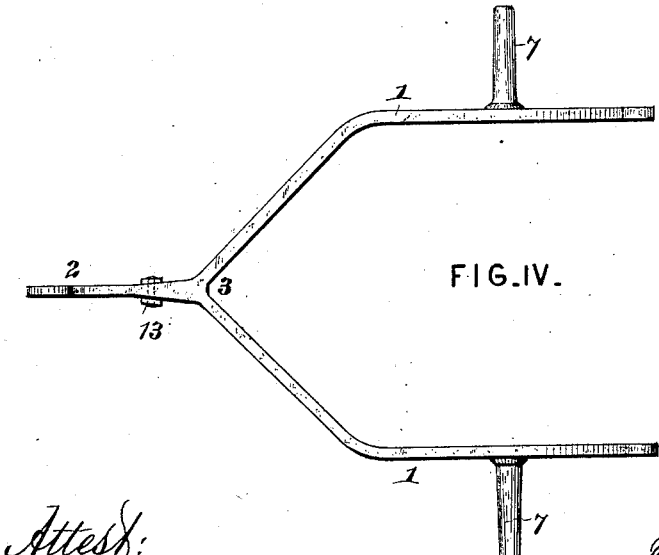
FIG. V.
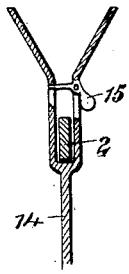
Attest:
Geo. T. Smallwood,
F. A. Hopkins
Inventor:
Fred W. Hubbard.
By Knight Bros.
Attys
N. PETERS, Photo-Lithographer, Washington, D. C.

UNITED STATES PATENT OFFICE.

FRED W. HUBBARD, OF COLUMBUS, OHIO, ASSIGNOR TO THE KILBOURNE & JACOBS MANUFACTURING COMPANY, OF SAME PLACE.

WHEELED SCRAPER.

SPECIFICATION forming part of Letters Patent No. 354,473, dated December 14, 1886.

Application filed November 17, 1885. Serial No. 183,122. (No model.)

*To all whom it may concern:*

Be it known that I, FRED W. HUBBARD, a citizen of the United States, residing at Columbus, in the county of Franklin and State of Ohio, have invented a new and useful Improvement in Wheeled Scrapers, of which the following is a specification.

My invention relates to that class of wheeled scrapers which are constructed with a forked operating-lever, taking the place of the ordinary crank-axle, and having the wheel arms or journals projecting outwardly from its respective prongs, which latter extend forward beyond said wheel-journals, and are connected to the sides of the bowl by links, so as to afford advantageous leverage in throwing the nose of the scraper out of the ground.

My invention consists in certain features of novelty, hereinafter fully described in the specification, and more particularly pointed out in the sequel thereto.

In the accompanying drawings, Figure I is a side elevation with one wheel removed, showing the filling position. Fig. II is a side elevation showing the carrying position. Fig. III is a side elevation showing the dumping position. Fig. IV is a plan view of the combined axle and operating-lever. Fig. V is a detached view of the fastening.

The operating-lever 1 is constructed with an upwardly or rearwardly projecting handle, 2, and is bifurcated at 3 to extend over the sides of the bowl 4, which is connected to the forward extremities of the forked lever by links 5, jointed to the said extremities of the lever, and to studs 6 on the sides of the bowl. The forked lever 1 is provided with rigid arms 7, projecting horizontally in line with each other, and constituting the journals on which the wheels 8 turn. The tongue or hounds 9 are connected to the bowl by studs 6, by which the bowl is suspended from the operating-lever, or may be attached by separate studs, if preferred. Near the front of the bowl, and in advance of the studs by which the tongue is connected thereto, bearing-studs 10 are provided, for use in elevating the bowl to carrying position, as hereinafter described. A third pair of studs, 11, project from the sides of the bowl above and slightly in rear of the suspension-studs 6, to limit the backward movement of the suspension-links 5 to a vertical position, and these studs may serve as additional fulcrums in raising the bowl. The bowl 4 is provided with the customary rearwardly-projecting handle, 12, for use in a drag-scraper, and the operating-lever 1 with a catch, 13, of any usual or suitable construction, for supporting the rear of the bowl in carrying position and throwing it over in the act of dumping. On the tongue 9 is a standard, 14, of Y shape, adapted, when the bowl is inverted, to receive the handle 2, and provided with a suitable catch, 15, to retain it therein, so as to secure the bowl in its inverted position.

By curving the extremities of the forked lever upward, as shown, and dispensing with the use of an axle separate from or additional to said forked lever, I am enabled to elevate the bowl to the position shown in Fig. II, bringing its center of gravity so near the level of the wheel-arms 7, on which it turns, that the inversion of the bowl for dumping is effected with very slight exertion.

The operation of the scraper is as follows: The parts being in the position shown in Fig. I, the scraper is drawn forward in customary manner until it is filled. The handle 2 is then drawn backward and downward, lifting the nose of the scraper out of the ground until the studs 10 come in contact with the hounds or tongue 9. The backward pressure on the handle 2 resisting the forward movement of the wheels causes the continued draft of the team to elevate the loaded bowl as soon as the nose of the scraper is freed from the ground, the studs 10 constituting a fulcrum-point, by which the body or rear of the bowl is lifted to carrying position by the depression of the handle 2. The operation of lifting the bowl is thus effected by the aid of the team with but little exertion. The operating-lever being brought down to the position shown in Fig. II, the catch 13 engages with the rear of the bowl, so as to support it in its elevated position, the top of the bowl being, as will be seen, elevated well above the level of the wheel-journals 7. The dumping-ground being reached, the operator with a slight lift on the handle 2 tips the bowl until its nose reaches the ground, when it is thrown over by the forward movement of the team, the handle 2 falling into the bifurcated or Y-shaped standard 14, and being held by the catch 15, in which position the scraper may be taken back to the place of filling or conveyed to any distance.

Having thus described my invention, the following is what I claim as new therein and desire to secure by Letters Patent:

1. The combination, with the bowl and the ground-wheels and their journals, of the bifurcated operating-lever supported thereby, having its prongs bent at their forward extremities and connected to the bowl, substantially as set forth.

2. The combination, with the ground-wheels 8 and the bowl 4, of the bifurcated operating-lever 1, the wheel-journals 7, projecting outwardly from the respective prongs of said operating-lever, the links 5, connecting the extremities of the respective prongs to the bowl, the stud 11, projecting from the bowl in rear of said links, the catch 13, and the draft-hounds connected to the bowl, all constructed and arranged to operate substantially as set forth.

3. The Y-shaped standard mounted on the tongue and provided with a catch to receive and retain the operating-lever, substantially as herein set forth.

4. The combination, with the ground-wheels 8 and the bowl 4, of the bifurcated operating-lever 1, having its prongs bent at their extremities, substantially as described, the wheel-journals projecting outwardly from the respective prongs, the links 5, connecting the extremities of the prongs with the bowl, the draft-hounds 9, connected to the bowl, the studs 10 and 11, projecting from the bowl across the path of the hounds 9 and the links 5, respectively, and a catch for holding the bowl elevated in carrying position, substantially as set forth.

FRED W. HUBBARD.

Witnesses:
OCTAVIUS KNIGHT,
HARRY E. KNIGHT.